(12) United States Patent
Chaillou et al.

(10) Patent No.: US 11,353,064 B2
(45) Date of Patent: Jun. 7, 2022

(54) MOTOR VEHICLE ROTARY ELECTRIC MACHINE DRIVE ASSEMBLY

(71) Applicant: Valeo Equipements Electriques Moteur, Creteil (FR)

(72) Inventors: Jimmy Chaillou, Etaples-sur-Mer (FR); Pierre-Yves Bilteryst, Etaples-sur-Mer (FR); Henri Delianne, Etaples-sur-Mer (FR); David Margueritte, Etaples-sur-Mer (FR); Eric Jozefowiez, Etaples-sur-Mer (FR); Sylvain Perreaut, Etaples-sur-Mer (FR); Mohamed El-Ghazal, Etaples-sur-Mer (FR); Lionel Delecroix, Étaples-sur-Mer (FR); Hubert Debruyne, Étaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 243 days.

(21) Appl. No.: 16/625,062

(22) PCT Filed: Jun. 27, 2018

(86) PCT No.: PCT/EP2018/067312
§ 371 (c)(1),
(2) Date: Dec. 20, 2019

(87) PCT Pub. No.: WO2019/002402
PCT Pub. Date: Jan. 3, 2019

(65) Prior Publication Data
US 2020/0149591 A1 May 14, 2020

(30) Foreign Application Priority Data
Jun. 28, 2017 (FR) ...................... 1755923

(51) Int. Cl.
*F16D 1/072* (2006.01)
*F16H 55/36* (2006.01)
*F02B 63/04* (2006.01)

(52) U.S. Cl.
CPC ............. *F16D 1/072* (2013.01); *F16H 55/36* (2013.01); *F02B 63/042* (2013.01)

(58) Field of Classification Search
CPC ......... F16D 1/072; F16H 55/36; F02B 63/042
See application file for complete search history.

(56) References Cited

U.S. PATENT DOCUMENTS 5,275,577 A * 1/1994 Hildebrandt ......... H02K 7/1004
474/174
2008/0028612 A1 2/2008 Shirokoshi
(Continued)

FOREIGN PATENT DOCUMENTS

CN 103836083 A 6/2014
DE 3732223 A1 4/1988
(Continued)

OTHER PUBLICATIONS

The First Office Action issued in corresponding Chinese Application No. 201880043947.7, dated Jun. 3, 2021 (12 pages).
(Continued)

*Primary Examiner* — Jacob M Amick
(74) *Attorney, Agent, or Firm* — Osha Bergman Watanabe & Burton LLP

(57) ABSTRACT

The present invention relates to a motor vehicle rotary electric machine (100) drive assembly, the drive assembly comprising a rotor shaft (2) extending along a longitudinal axis (X) and a connecting piece (4) providing connection between the shaft and the torque transmission system comprising a bore (41) for the passage of the rotor shaft, the drive assembly being characterized in that the bore com-
(Continued)

prises a first wall (41*a*) extending axially and a cylindrical second wall (41*b*) extending axially in alignment with the first wall, and in that the rotor shaft comprises: —a first surface (21) extending axially and cooperating with the first wall of the bore to centre the connecting piece around the rotor shaft; and—a second cylindrical surface (22) extending axially and provided with knurling, with a diameter (A) greater than the diameter (A') of the second wall of the bore, the connecting piece being force-fitted onto the rotor shaft by means of the knurling.

6 Claims, 2 Drawing Sheets

(56) References Cited

U.S. PATENT DOCUMENTS

| | | |
|---|---|---|
| 2009/0158576 A1 | 6/2009 | Pfleger et al. |
| 2015/0141184 A1 | 5/2015 | Yu |

FOREIGN PATENT DOCUMENTS

| | | |
|---|---|---|
| DE | 10137025 C1 | 12/2002 |
| EP | 0661474 A1 | 7/1995 |
| EP | 1892430 A2 | 2/2008 |
| FR | 2898068 A1 | 9/2007 |
| JP | 2008-038932 A | 2/2008 |
| JP | 2011-254602 A | 12/2011 |
| WO | 8904780 A1 | 6/1989 |
| WO | 03100278 A1 | 12/2003 |

OTHER PUBLICATIONS

International Search Report and Written Opinion in corresponding International Application No. PCT/EP2018/067312, dated Oct. 8, 2018 (13 pages).

Decision of Rejection issued in corresponding Japanese Application No. 2019-572614, dated Oct. 26, 2021 (5 pages).

* cited by examiner

MOTOR VEHICLE ROTARY ELECTRIC MACHINE DRIVE ASSEMBLY

TECHNICAL FIELD OF THE INVENTION

The technical field of the invention is that of rotary electric machines, such as an alternator or a starter-alternator, equipping combustion engine motor vehicles.

The invention relates to a drive assembly of a rotary electric machine comprising a rotor shaft and a connecting piece (for example, a pulley or a pinion) providing connection between the shaft and the torque transmission system (for example, a belt or a chain).

TECHNOLOGICAL BACKGROUND OF THE INVENTION

A combustion engine motor vehicle is equipped with an alternator which has a function of transforming mechanical energy coming from the engine into electrical energy with the aim in particular of recharging the battery of the vehicle and electrically supplying the onboard power network of the vehicle.

The alternator is a rotary electric machine comprising a shaft on which a pulley is mounted. This pulley is connected by a belt to another pulley mounted on the crankshaft of the engine. The belt transmits the rotational movement of the crankshaft to the shaft of the alternator.

It is common to rotationally lock the pulley around the shaft by means of a retaining nut. However, the clamping force produced by this means of fixing may not be sufficient to keep the pulley integral with the shaft. Indeed, when the alternator is in operation, the nut is likely to loosen, in particular if the pulley is subjected to high torque.

Thus there appears a need to improve rotational locking of the pulley around the shaft.

SUMMARY OF THE INVENTION

The invention proposes a solution to improve the maintenance of a connecting piece (for example, a pulley or a pinion) providing connection between the shaft and the torque transmission system (for example, a belt or a chain), said connecting piece being integrally mounted rotationally and translationally on a shaft.

A first aspect of the invention relates to a drive assembly of a motor vehicle rotary electric machine, the drive assembly comprising a rotor shaft extending along a longitudinal axis and a connecting piece providing connection between the shaft and the torque transmission system comprising a bore for the passage of the rotor shaft, the bore comprising a first wall extending axially and a cylindrical second wall extending axially in alignment with the first wall, the rotor shaft comprising:
- a first surface extending axially and cooperating with the first wall of the bore to centre the connecting piece around the rotor shaft; and
- a second cylindrical surface extending axially and provided with knurling having a diameter greater than the diameter of the second wall of the bore, the connecting piece being force-fitted onto the rotor shaft by means of the knurling.

The knurling consists of a plurality of projections which come to hollow out furrows in the wall of the bore when the connecting piece is force-fitted onto the shaft. Thus, by virtue of the invention, it is possible to ensure rotational locking of the connecting piece on the shaft by means of the knurling while guaranteeing that the connecting piece is mounted in a centered way.

The drive assembly according to the first aspect of the invention can also comprise one or more features among the following, considered individually or according to the technically possible combinations:
- the first surface of the rotor shaft and the first wall of the bore are cylindrical surfaces having the same diameter;
- the first surface of the rotor shaft and the first wall of the bore each present a surface quality comprising irregularities having dimensions less than a characteristic dimension;
- the connecting piece is mounted on the level of a first end of the rotor shaft, the diameter of the first surface of the rotor shaft being greater than the diameter of the knurling, the knurling being arranged between the first surface and the first end of the rotor shaft;
- the diameter of the first surface of the rotor shaft ranges between 1 and 2 times the diameter of the knurling;
- the connecting piece is mounted on the level of a first end of the rotor shaft, the diameter of the first surface of the rotor shaft being less than the diameter of the knurling, the first surface being arranged between the knurling and the first end of the rotor shaft;

A second aspect of the invention relates to a rotary electric machine comprising a drive assembly according to the first aspect of the invention.

BRIEF DESCRIPTION OF THE FIGURES

The invention and its various applications will be understood better on reading the description which follows and examining the figures which accompany it, among which.

The figures are only given as an indication and by no means are restrictive of the invention.

For better clarity, identical or similar elements are shown with identical reference symbols on all figures.

DETAILED DESCRIPTION OF EMBODIMENTS OF THE INVENTION

Figure 1:
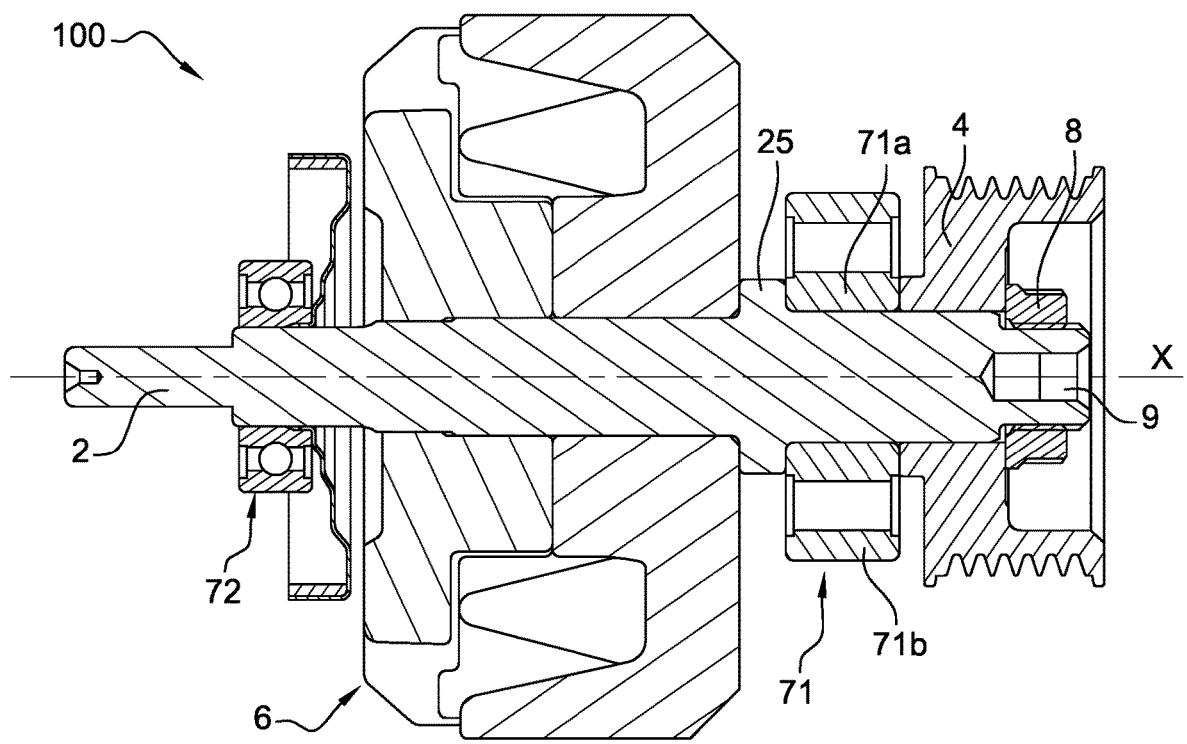
FIG. 1 is a partial schematic view in longitudinal section of an embodiment of an alternator according to the invention.

An embodiment of an alternator 100 according to the invention will now be described with reference to FIG. 1. The alternator is a rotary electric machine configured to transform mechanical energy coming from a combustion engine motor vehicle into electrical energy. According to another embodiment of the invention, the rotary electric machine can be a starter-alternator.

Alternator 100 comprises a drive assembly comprising a rotor shaft 2 extending along a longitudinal axis X and a connecting piece providing connection between the shaft and the torque transmission system 4 integrally mounted rotationally and translationally on a front end of shaft 2.

This connecting piece is embodied in the example illustrated by a pulley. In this case, the torque transmission system is embodied by a belt.

In a different non-illustrated version, this connecting piece can be embodied by a pinion. In this case, the torque transmission system is embodied by a chain. In the continuation of the description, the selected example is that of a pulley. However it is understood that this pulley could be replaced by a pinion.

In the whole of the description and claims, the terms—"front", "rear", "in front" and "behind" are used to characterize relative positions in the framework of alternator 100, the front of alternator 100 corresponding to the end of shaft 2 provided with pulley 4.

Alternator 100 also comprises a rotor 6 integrally mounted rotationally on shaft 2, and a stator (not illustrated) surrounding rotor 6. The stator is carried by a casing (not illustrated) rotationally mounted relative to shaft 2 by means of a front ball bearing 71 and a rear ball bearing 72 arranged on both sides of rotor 6.

Shaft 2 comprises a thrust bearing 25 arranged between rotor 6 and the front bearing 71. Front bearing 71 comprises an inner bearing race 71a in contact with shaft 2 and an outer bearing race 71b. The inner race 71a of front bearing 71 rests against thrust bearing 25 and pulley 4 is held tightly against the inner race 71a by means of a retaining nut 8. The front end of shaft 2 comprises an indentation 9 intended to receive a key rendering it possible to rotationally lock shaft 2 during the assembly of pulley 4.

The combustion engine comprises a crankshaft able to move rotationally. Pulley 4 is intended to be rotated by a belt mechanically connecting pulley 4 of alternator 100 to a pulley integrally mounted rotationally on the crankshaft. The rotational movement of the crankshaft is transmitted to pulley 4, shaft 2 and rotor 6, these elements being integrally mounted rotationally.

Figure 2:
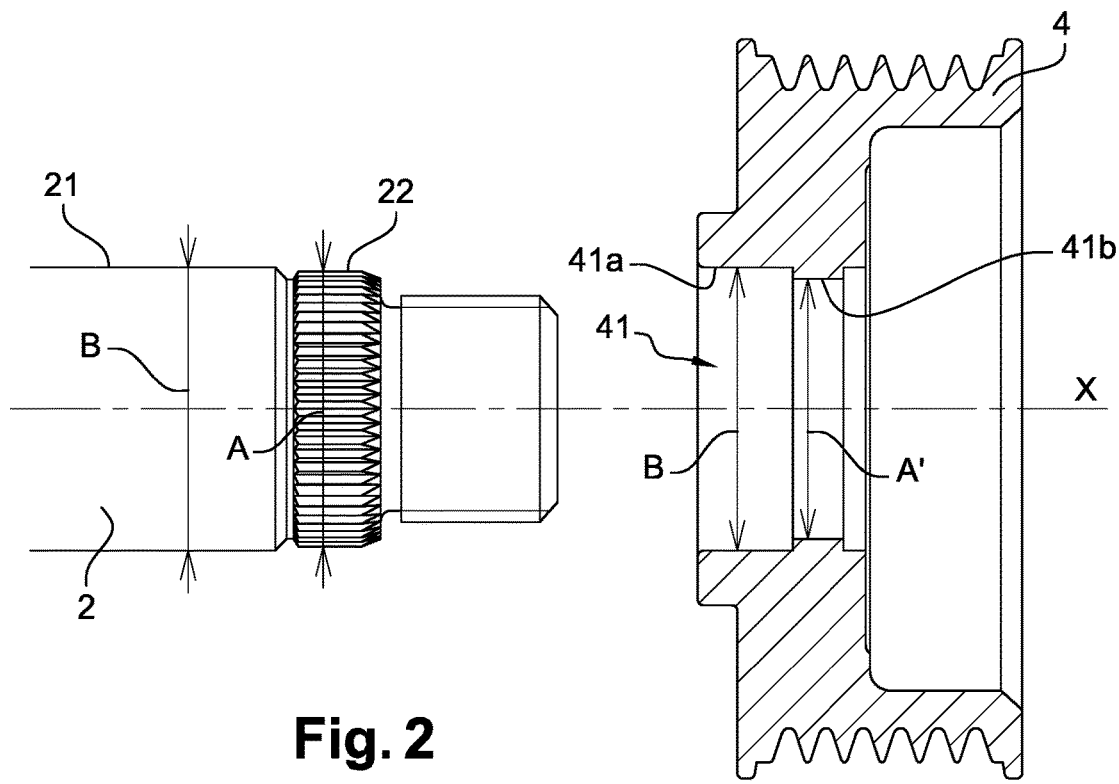
FIG. 2 is a partial exploded schematic view of a first embodiment of the drive assembly of the alternator on FIG. 1.

FIG. 2 shows a partial exploded schematic view of a first embodiment of the drive assembly of alternator 100. Pulley 4 comprises a bore 41 for the passage of rotor shaft 2. Bore 41 comprises a first wall 41a and a second wall 41b which extend axially in alignment with one another. The second wall 41b has a cylindrical shape.

Rotor shaft 2 comprises a first surface 21 and a second surface 22 which extend axially in alignment with one another. The second surface 22 extends over all the circumference of shaft 2 and presents a general shape complementing that of the second wall 41b of bore 41. The second surface 22 has a cylindrical shape.

As illustrated on FIG. 2, the second surface 22 is provided with a knurling having a diameter A substantially greater than the A' diameter of the second wall 41b of bore 41. Pulley 4 is force-fitted onto the rotor shaft 2 by means of the knurling. In addition to the retaining nut 8, the knurling contributes to rotationally and translationally locking pulley 4 on shaft 2. Diameter A of the knurling preferably ranges between 1 and 1.1 times the A' diameter of the second wall 41b of bore 41.

During the assembly of pulley 4 on shaft 2, the first surface 21 cooperates with the first wall 41a of the bore to center the pulley around shaft 2. Indeed, the knurling alone does not render it possible to suitably align the centre of pulley 4 with the longitudinal axis X which corresponds to the rotational axis of shaft 2. By virtue of the co-operation of these centering surfaces, the rotational axis of pulley 4 is combined with that of shaft 2 and pulley 4 then is not unbalanced.

In the embodiment of FIG. 2, the first surface 21 of shaft 2 and the first wall 41a of bore 41 have a cylindrical shape. Alternatively the same diameter B, the first surface 21 of shaft 2 and the first wall 41a of bore 41 can both present one or several flat surfaces which are parallel with the longitudinal axis X and arranged in a circumferential way. In this case, the first surface 21 of shaft 2 and the first wall 41a of bore 41 have a cylindrical shape, truncated longitudinally, which renders it possible to improve the rotational locking of pulley 4 on the rotor shaft 2.

The first centering surface 21 extends over a length preferably ranging between 1 and 3 times the length of surface 22. It should be noted that surface 21 forms a functional guidance zone between the shaft and the pulley.

The knurling extends over a length preferably ranging between 0.1 and 1 times the diameter of shaft 2.

In the embodiment of FIG. 2, the diameter B of the first surface 21 of shaft 2 is greater than diameter A of the knurling. The diameter B of the first surface 21 of the rotor shaft then preferably ranges between 1 and 2 times the diameter B of the knurling. In this case, the knurling is arranged in front of the first surface 21. In a complementary way, the second wall 41b of bore 41 is arranged in front of the first wall 41a of bore 41.

Figure 3:
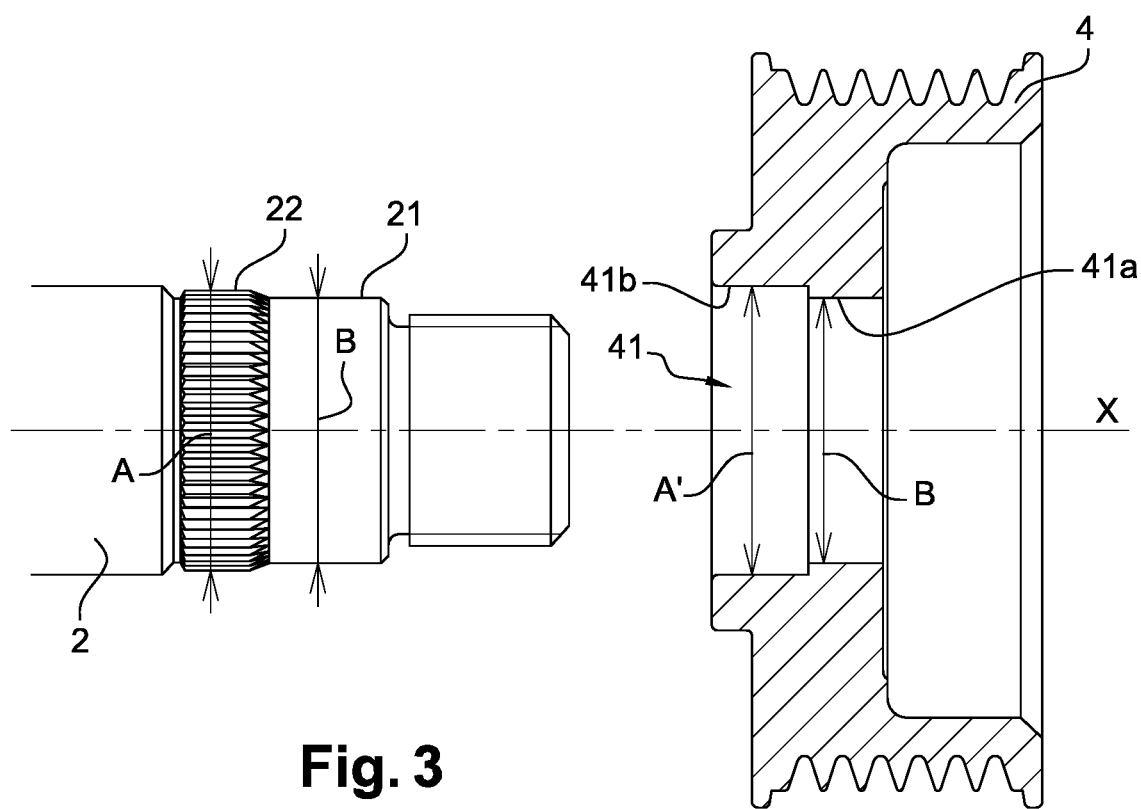
FIG. 3 is a partial exploded schematic view of a second embodiment of the drive assembly of the alternator on FIG. 1.

FIG. 3 shows a second embodiment of a drive assembly according to the invention in which the diameter B of the first surface 21 of shaft 2 is less than diameter A of the knurling. Diameter A of the first surface of the rotor shaft then preferably ranges between 0.5 and 1 times the diameter B of the knurling In this case, the knurling is arranged behind the first surface 21. In a complementary way, the second wall 41b of bore 41 is arranged behind the first wall 41a of bore 41.

Advantageously, the first surface 21 of rotor shaft 2 and the first wall 41a of bore 41 each present a surface quality comprising irregularities having dimensions less than a characteristic dimension. According to one embodiment, the first surface 21 and the first wall 41a are visually devoid of irregularities. According to another embodiment, the first surface 21 and the first wall 41a are homogeneous to the touch. In other words, the first surface 21 of the rotor shaft 2 and the first wall 41a of bore 41 are configured to be substantially smooth so as to facilitate centering of pulley 4 on shaft 2.

Naturally, the invention is not limited to the embodiments described with reference to the figures and alternatives could be considered without leaving the framework of the invention. The first surface 21 of the shaft provided to centre pulley 4 can in particular comprise a first part and a second part arranged on both sides of the knurling. Moreover, the pulley could also be replaced by a pinion and the torque transmission system, for example by a chain.

The invention claimed is:

1. A motor vehicle rotary electric machine drive assembly, the drive assembly comprising:
   a rotor shaft extending along a longitudinal axis; and
   a connecting piece providing connection between the rotor shaft and a torque transmission system comprising a bore for passage of the rotor shaft,
   wherein the bore comprises a first wall extending axially and a cylindrical second wall extending axially in alignment with the first wall, and
   wherein the rotor shaft comprises:
      a first surface extending axially and cooperating with the first wall of the bore to center the connecting piece around the rotor shaft,
      a second cylindrical surface extending axially and provided with a knurling having a diameter greater than the diameter of the second wall of the bore, the connecting piece being force-fitted onto the rotor shaft by means of the knurling, wherein the first surface of the rotor shaft and the first wall of the bore are cylindrical surfaces having a same diameter, wherein the connecting piece is mounted on a level of a first end of the rotor shaft, and the diameter of the first surface of the rotor shaft is greater than the diameter of the knurling, the knurling being arranged between the first surface and the first end of the rotor shaft.

2. The assembly according to claim 1, wherein the first surface of the rotor shaft and the first wall of the bore each present a surface quality comprising irregularities having dimensions less than a characteristic dimension.

3. The assembly according to claim 1, wherein the diameter of the first surface of the rotor shaft ranges between 1 and 2 times the diameter of the knurling.

4. The assembly according to claim 1, wherein the first surface extends over a length ranging between 1 and 3 times the length of the knurling.

5. The assembly according to claim 1, wherein the knurling extends over a length ranging between 0.1 and 1 times the diameter of the rotor shaft.

6. A rotary electric machine, comprising: a drive assembly according to claim 1.

* * * * *